United States Patent
Abubakar et al.

(10) Patent No.: US 8,249,812 B2
(45) Date of Patent: *Aug. 21, 2012

(54) CHARACTERIZING AN EARTH SUBTERRANEAN STRUCTURE BY ITERATIVELY PERFORMING INVERSION BASED ON A FUNCTION

(75) Inventors: Aria Abubakar, North Reading, MA (US); Tarek Habashy, Burlington, MA (US); David Alumbaugh, Berkeley, CA (US); Ping Zhang, Albany, CA (US); Guozhong Gao, Albany, CA (US); Jianguo Liu, Durham, NC (US)

(73) Assignee: Schlumberger Technology Corporation, Sugar Land, TX (US)

( * ) Notice: Subject to any disclaimer, the term of this patent is extended or adjusted under 35 U.S.C. 154(b) by 644 days.

This patent is subject to a terminal disclaimer.

(21) Appl. No.: 12/142,216

(22) Filed: Jun. 19, 2008

(65) Prior Publication Data

US 2009/0157320 A1   Jun. 18, 2009

Related U.S. Application Data

(63) Continuation-in-part of application No. 11/769,031, filed on Jun. 27, 2007, now Pat. No. 7,756,642.

(51) Int. Cl.
G01V 3/40 (2006.01)
G01V 3/18 (2006.01)
G01V 5/04 (2006.01)
G01V 9/00 (2006.01)

(52) U.S. Cl. ........ 702/7; 702/6; 702/9; 702/11; 324/345

(58) Field of Classification Search ....... 702/7; 324/345
See application file for complete search history.

(56) References Cited

U.S. PATENT DOCUMENTS

| | | | |
|---|---|---|---|
| 4,314,339 A | 2/1982 | Kenyon | |
| 5,469,062 A | 11/1995 | Meyer, Jr. | |
| 5,900,733 A * | 5/1999 | Wu et al. | 324/338 |
| 6,294,917 B1 | 9/2001 | Nichols | |
| 6,393,363 B1 | 5/2002 | Wilt et al. | |
| 6,643,589 B2 | 11/2003 | Zhang et al. | |
| 7,277,796 B2 | 10/2007 | Kuchuk et al. | |
| 7,386,430 B2 | 6/2008 | Barber et al. | |
| 7,756,642 B2 * | 7/2010 | Abubakar et al. | 702/7 |
| 2002/0173914 A1 * | 11/2002 | Zhang et al. | 702/7 |

(Continued)

OTHER PUBLICATIONS

Abubakar et al., "A fast and rigorous 2.5D inversion algorithm for cross-well electromagnetic data," SEG Annual Meeting, Houston, TX, pp. 534-538, 2005.

(Continued)

*Primary Examiner* — Eliseo Ramos Feliciano
*Assistant Examiner* — Yaritza H Perez Bermudez
(74) *Attorney, Agent, or Firm* — Darla P. Fonseca; Jeremy Berman

(57) ABSTRACT

To characterize an earth subterranean structure using a measurement assembly including electromagnetic (EM) receivers and one or more EM sources, measured voltage data collected by EM receivers in response to transmission by one or more EM sources is received. Based on a model, predicted EM data is computed. Inversion is iteratively performed according to a function that computes a difference between the measured voltage data and a product of a term containing the predicted EM data and a term containing distortion data that accounts at least for distortion effect by an environment of the measurement assembly. The inversion is iteratively performed to solve for parameters of the model and the distortion data.

3 Claims, 4 Drawing Sheets

U.S. PATENT DOCUMENTS

| | | |
|---|---|---|
| 2004/0059513 A1 | 3/2004 | Bittar et al. |
| 2005/0168225 A1 | 8/2005 | Haber et al. |
| 2006/0015258 A1* | 1/2006 | Dubourg et al. ............... 702/11 |
| 2006/0217888 A1 | 9/2006 | Frenkel |
| 2009/0005993 A1 | 1/2009 | Abubakar et al. |

OTHER PUBLICATIONS

Farquharson and Oldenburg, "Non-linear inversion using general measures of data misfit and model structure," Geophys. J. Int., 134:213-227, 1998.

Habashy and Abubakar, "A general framework for constraint minimization for the inversion of electromagnetic measurements," Progress in Electromagnetics Research, PIER 46:265-312, 2004.

Newman, "Deep transient electromagnetic soundings with a grounded source over near surface conductors," Geophys. J. Int., 98:587-601, 1989.

Torres-Verdin and Bostick, "Principles of spatial electric filed filtering in magnetotellurics: electromagnetic array profiling (EMAP)," Geophysics, 57(4):603-622, 1992.

Uchida, Lee and Wilt, "Effect of a steel casing on crosshole EM measurement," 1991 Annual Meeting SEG.

Van den Burg, Kooij and Kleinman, "Image reconstruction from Ipswich data—III," IEEE Antennas and Propagation Magazine, 41(2):27-32,1999.

Wu and Habashy, "Influence of steel casings on electromagnetic signals," Geophysics,59(3):378-390, 1994.

Augustin, A.M. et al., A Theoretical Study of Surface-to-Borehole Electromagnetic Logging in Cased Holes, Geophysics vol. 54, No. 1, Jan. 1989, pp. 90-99.

Wu et al., "Influence of Steel Casings on Electromagnetic Signals," Geophysics, v. 59, No. 3, pp. 378-390 (Mar. 1, 1994).

Augustine et al., "A Theoretical Study of Surface-to-Borehole Electromagnetic Logging in Cased Holes," Geophysics, v. 54, No. 1, pp. 90-99 (Jan. 1, 1989).

* cited by examiner

US 8,249,812 B2

CHARACTERIZING AN EARTH SUBTERRANEAN STRUCTURE BY ITERATIVELY PERFORMING INVERSION BASED ON A FUNCTION

This is a Continuation-in-Part of U.S. application Ser. No. 11/769,031 filed Jun. 27, 2007 now U.S. Pat. No. 7,756,642 entitled "CHARACTERIZING AN EARTH SUBTERRANEAN STRUCTURE BY ITERATIVELY PERFORMING INVERSION BASED ON A FUNCTION."

TECHNICAL FIELD

The invention relates generally to characterizing an earth subterranean structure that includes iteratively performing inversion based on a cost function that computes a difference between measured voltage data and a product of a term containing predicted electromagnetic data and a term containing distortion parameter.

BACKGROUND

Geological formations forming a reservoir for the accumulation of hydrocarbons in the subsurface of the earth contain a network of interconnected paths in which fluids are disposed that may ingress or egress from the reservoir. To determine the behavior of the fluids in this network, knowledge of both the porosity and permeability of the geological formations is desired. From this information, efficient development and management of hydrocarbon reservoirs may be achieved. For example, the resistivity of geological formations is a function of both porosity and permeability. Considering that hydrocarbons are electrically insulating and most water contain salts, which are highly conductive, resistivity measurements are a valuable tool in determining the presence of a hydrocarbon reservoir in the formations.

Electromagnetic (EM) surveying techniques have been used for characterizing geologic formations in the earth subsurface. An issue associated with EM surveying techniques is that wellbores lined with casings or liners (which are typically formed of steel) can adversely affect the accuracy of the surveying. The steel casing or liner has an effect on EM fields measured by EM receivers.

EM receivers measure electric and/or magnetic fields induced by EM sources. In a cross-borehole (CB) application, EM sources are placed in one wellbore and EM receivers are placed in a second wellbore. In a surface-to-borehole (STB) application, EM sources are placed on a land surface (or sea floor), whereas EM receivers are placed in a wellbore. In a borehole-to-surface (BTS) application, EM sources are placed in a wellbore, whereas EM receivers are placed on a land surface (or sea floor). In single-well (SW) borehole-to-borehole application, EM sources and receivers are both placed in the same wellbore. In each of the CB, STB, BTS and SW applications, a casing or liner may be present in a wellbore that contains the EM receivers and/or EM sources.

Another survey technique is a surface controlled source electromagnetic (CSEM) survey technique, in which both the EM sources and receivers are deployed on a surface (such as a sea floor or on land) within an area of interest to make measurements from which information about the earth subsurface can be derived. Note that the EM sources and/or receivers can also be towed in a body of water by a sea vessel. In the CSEM application, as well as in the STB and BTS applications, near-surface heterogeneity such as cultural structures including pipelines, metal fences, buildings, and geologic structures, can affect EM data measurements.

Removing effects of casings or liners, or near-surface heterogeneity, can improve image accuracy. Although various techniques have been proposed or implemented to reduce distortion caused by near-surface heterogeneity or removing effects of steel casing or liner in wellbores, it is noted that such techniques are subject to further improvement.

SUMMARY

In one aspect, the invention relates to a method of characterizing an earth subterranean structure using a measurement assembly including electromagnetic (EM) receivers and one or more EM sources, where the method includes receiving measured voltage data collected by the EM receivers in response to transmission of the one or more EM sources. Based on a model, predicted EM data is computed. Inversion is then iteratively performed, where the inversion is based on a cost function that computes a difference between the measured voltage data and a product of a term containing the predicted EM data and a term containing distortion parameters that accounts at least for distortion effect by an environment of the measurement assembly. Iteratively performing the inversion allows for parameters of the model and distortion data to be solved for. The measured voltage data is collected from one of a cross-borehole survey, a surface-to-borehole survey, a borehole-to-surface survey, and a single-well borehole-to-borehole survey.

According to another aspect, a system includes a measurement assembly including one or more electromagnetic (EM) sources and EM receivers. A data processing computer receives measured voltage data collected by the EM receivers in response to transmission by the one or more EM sources, and computes, based on a model, predicted EM data. Inversion is iteratively performed according to a cost function that computes a difference between the measured voltage data and a product of a term containing the predicted EM data and a term containing distortion parameters that account at least for distortion effect by an environment of the measurement assembly. Iteratively performing the inversion solves for parameters of the model and the distortion parameters. The measured voltage data is collected from one of a cross-borehole survey, a surface-to-borehole survey, a borehole-to-surface survey, and a single-well borehole-to-borehole survey.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1A:
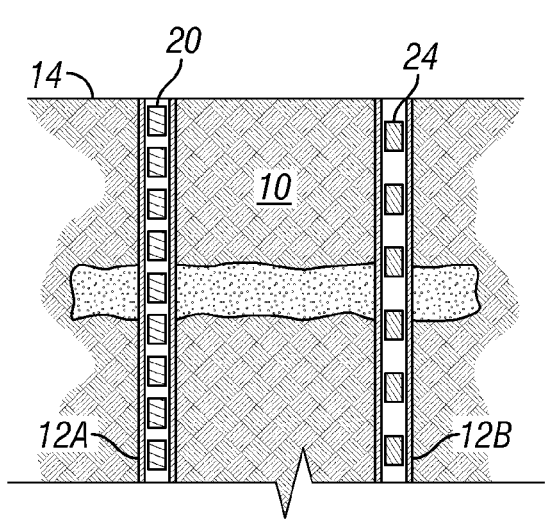
FIGS. 1A-1E illustrate various source-receiver acquisition arrangements for performing surveying techniques according to some examples.
Figure 1B:
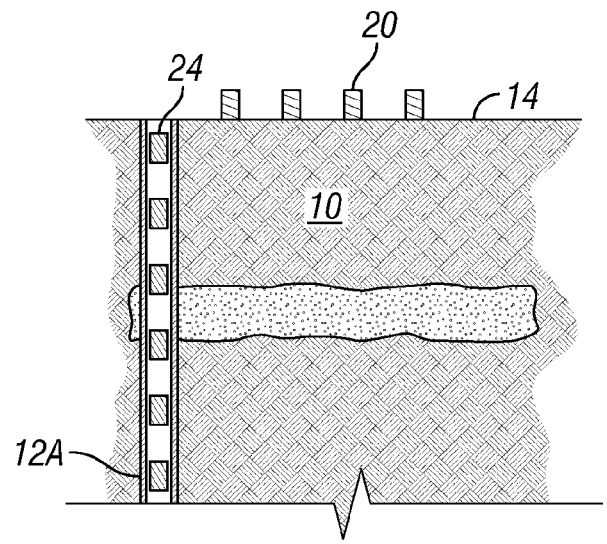
Figure 1C:
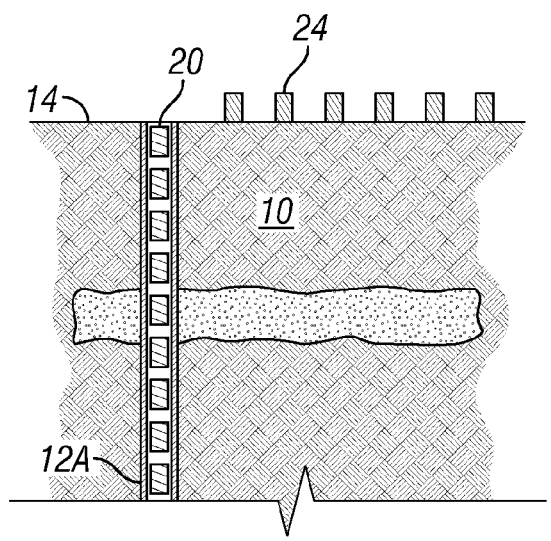
Figure 1D:
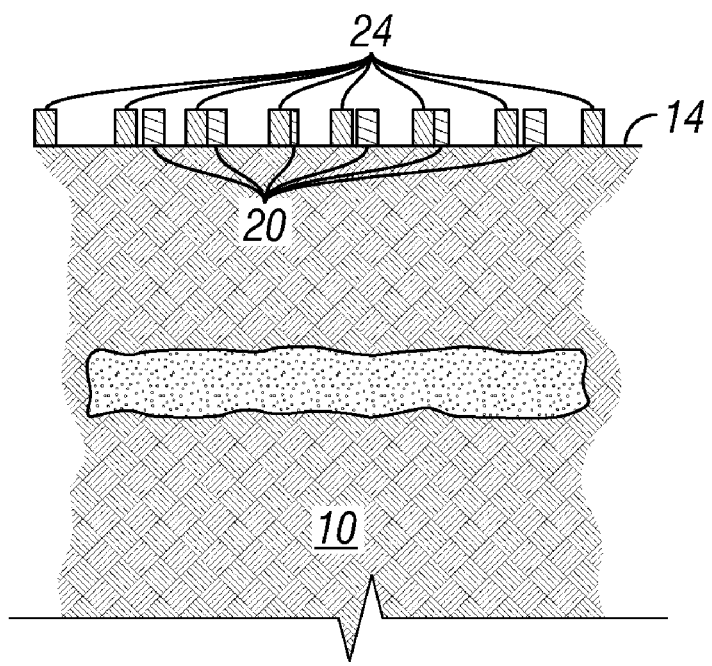
Figure 1E:
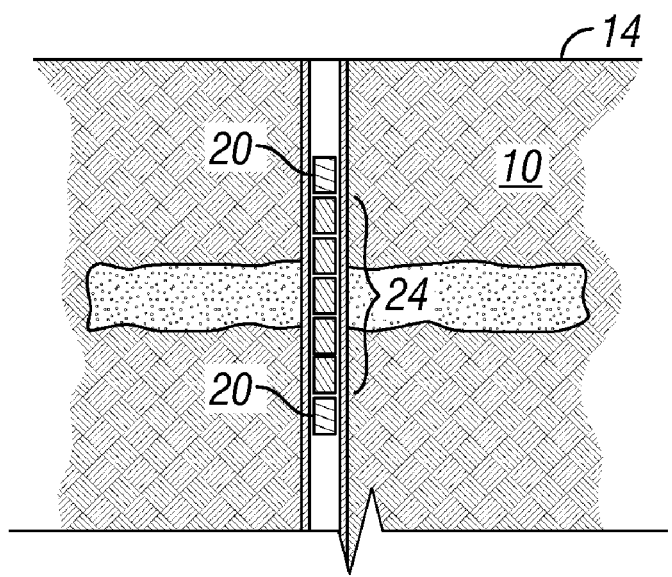

As illustrated in FIGS. 1A-1E, various electromagnetic (EM) surveying techniques can be used, including a cross-borehole (CB) surveying technique (FIG. 1A), surface-to-borehole (STB) surveying technique (FIG. 1B), borehole-to-surface (BTS) surveying technique (FIG. 1C), single-well (SW) borehole-to-borehole surveying technique (FIG. 1D), and surface controlled source EM (CSEM) surveying technique (FIG. 1E). With each of the EM surveying techniques, a series of electric or magnetic dipole sources 20 (hereinafter "EM sources") are energized in a borehole, on the surface of the earth, or near the sea floor, and measurements of magnetic and/or electric fields are made in a different borehole, or on the earth surface or sea floor by EM receivers 24. Note that the borehole can be open, cased with a non-electrically conductive liner such as fiberglass, or cased with an electrically conductive material such as steel. The purpose of the survey is to non-intrusively provide an image of the resistivity profile of a subterranean structure 10 such that location of resistive body(ies) can be determined. Examples of resistive bodies include hydrocarbon bearing reservoirs, gas injection zones, fresh water aquifers, and so forth. Conductive elements can also be detected, such as zones containing saline water, certain minerals, shale, clay, and so forth. The image allows for the characterization of the subterranean structure 10 to enable detection of hydrocarbon reservoirs and ground water aquifers, for monitoring reservoir production, for monitoring a ground water and gas injection process, and for imaging salt water intrusion into aquifers, as examples.

FIG. 1A illustrates EM sources 20 positioned in a first wellbore 12A, and EM receivers 24 positioned in a second wellbore 12B, where the wellbores 12A and 12B are drilled through the subterranean structure 10. A CB surveying technique is performed by activating the EM sources 20 in the first wellbore 12A to induce magnetic or electric fields in the subterranean structure 10 that can be measured by the EM receivers 24 in the second wellbore 12B.

FIG. 1B shows the STB arrangement in which EM sources 20 are positioned on a surface 14 (which can be a land surface or a sea floor), and the EM receivers are positioned in a wellbore 12A drilled through the subterranean structure 10.

FIG. 1C shows the BTS arrangement in which EM sources 20 are provided in the wellbore 12A drilled through the subterranean structure 10, and EM receivers 24 are positioned on the surface 14.

FIG. 1D shows the SW arrangement in which EM sources 20 are provided in the wellbore 12A drilled through the subterranean structure 10, and EM receivers 24 are positioned within the same wellbore 12A.

FIG. 1E shows the surface CSEM arrangement in which both the EM sources and EM receivers are positioned on the surface 14. In this arrangement, activation of the EM sources 20 causes EM fields to be propagated into the subterranean structure 10, with certain subterranean elements reflecting the EM fields back towards the surface 14 for detection by the EM receivers 14.

It is noted that each of the above examples shows multiple sources and multiple receivers. In other examples, methods may include using one or more receivers with one or more receivers where the receivers and/or the sources are moved to different locations and new data is acquired.

With the arrangements of FIGS. 1A-1D, measurements made by EM receivers 24 can be affected by presence of an electrically conductive lining structure inside a wellbore (e.g., wellbore 12A and/or 12B). A lining structure refers to either casing or a liner that lines an inner surface of a wellbore. Moreover, in each of the arrangements of FIGS. 1A-1E, measurements made by EM receivers can be affected by near-surface heterogeneity, including, as examples, due to presence of cultural structures such as pipelines, metal fences, buildings, geologic structures, and so forth.

Based on measurements taken by EM receivers in any of the arrangements of FIGS. 1A-1E, a data processing system is provided to reduce or remove effects of electrically conductive lining structure(s) in one or more wellbores, and/or reduce or remove distortions caused by near-surface heterogeneity. The data processing system employs a data inversion technique that is based on a cost function that computes a difference between measured voltage data and a product of a term containing predicted EM data (computed based on a model) and a term containing distortion parameters. The measured voltage data includes voltages measured by the EM receivers 24 due to magnetic or electric fields induced by one or more EM sources 20. The predicted EM data is data computed by a simulator regarding magnetic or electric fields predicted to be detected by EM receivers according to a model of the subterranean structure 10.

The distortion parameter accounts for one or more of the following effects: distortion caused by presence of a lining structure, distortion caused by near-surface heterogeneity, errors in calibration of the system that includes the EM sources and receivers, and any other effect that causes some variation of the true measured data. More generally, the distortion parameters account for effects of an environment of a measurement assembly that includes EM receivers and EM sources.

The data inversion technique performs iterative inversions to iteratively solve for unknown parameters of the distortion effects and for unknown parameters of the model. By iteratively updating the model and solving for the distortion data parameters, convergence of the data inversion process can be achieved to derive a relatively accurate solution for reservoir parameters (that form a model of the subterranean structure 10).

To perform inversion of data derived from measurements taken by EM receivers to produce a 2D (or 3D) image of the reservoir electrical resistivity, an algorithm that numerically minimizes the following cost function can be used:

$$s_d = \|W_d[d_{Obs} - d_{Pr}(m)]\| \quad \text{(Eq. 1)}$$

In Eq. 1, $d_{Obs}$ is a vector of measured data, $d_{Pr}$ is a vector of numerical data (predicted data) calculated by a forward modeling algorithm that accounts for 2D or 3D geologic structures, m is the model vector of resistivities at different positions between and around the wells that is being reconstructed, and $W_d$ is a data weighting matrix that can include information about the quality of the data in a statistical sense. The cost function of Eq. 1 is a measure of data misfit between measured EM data and predicted EM data computed based on a current model.

For cross-borehole EM data, as well as measured EM data using any of the other EM surveying techniques, the relationship between $d_{Pr}$ and m is nonlinear, and thus the inversion is solved iteratively by linearizing about a current model, and iteratively updating the model. The equation for updating the model that can be employed is as follows:

$$m^i = (J^T W_d^T W_d J + \lambda W_m^T W_m)^{-1} [J^T W_d^T W_d (d_{Obs} - d_{Pr}^{i-1}) + J^T W_d^T W_d J m^{i-1} + \lambda W_m^T W_m m^{ref}] \quad \text{(Eq. 2)}$$

In Eq. 2, $m^i$ is the updated model that is to be solved for at the $i^{th}$ iteration, $m^{i-1}$ and $d_{Pr}^{i-1}$ are the model and predicted data, respectively, from the previous iteration (i−1), and $m^{ref}$ is a reference or a priori (initial) model used to get as close to the true model as possible before starting the inversion procedure. Note, $\lambda$ is a regularization parameter for stabilizing the inversion process, and $W_m$ is the model covariance matrix, both of which are introduced to constrain the model to have certain properties, and are not relevant to the technique described herein.

The matrix J is the Jacobian or sensitivity matrix that relates small changes in data to small changes in the model parameters, i.e., $$J_{t_i r_j l} = \partial (d_{pr}(m))_{t_i r_j} / \partial m_l, \quad \text{(Eq. 3)}$$

where the $t_i r_j$ subscript represents the data point collected with the $i^{th}$ EM source and $j^{th}$ EM receiver, and the subscript l represents the $l^{th}$ model parameter.

In general, the inversion algorithm is designed to iteratively determine a model that reduces the norm (cost function) given by Eq. 1 from one iteration to the next. The iterative process is terminated when either the norm measured by Eq. 1 converges, or a predetermined number of iterations have been performed.

When measurement data is collected with an EM receiver in a wellbore that is cased with an electrically conductive lining structure, such as in the FIG. 1A, 1B, 1C, or 1D arrangement, or the measurement data is collected by an EM receiver in a location (wellbore or surface) affected by near-surface heterogeneity (in any of the FIGS. 1A-1E arrangements), the resulting measurement is simply the product of a complex distortion coefficient and the formation response that is to be recovered, i.e., $$H_{t_i r_j}^c = k_{r_j} H_{t_i r_j}^0, \quad \text{(Eq. 4)}$$

where $H_{t_i r_j}^c$ refers to the measurement for the $i^{th}$ EM source and $j^{th}$ EM receiver, $H_{t_i r_j}^0$ is the formation response that is to be recovered, and $k_{r_j}$ is the distortion parameter for the $j^{th}$ receiver position. Note that $k_{r_j}$ can represent a distortion in the measurement due to effects of an electrically conductive lining structure, or due to localized inhomogeneities near the wellbore, or due to localized geologic variations and/or man-made structures (near-surface heterogeneity).

The EM receivers actually measure voltages that are induced in the respective receiver coils by a magnetic field that is generated by an EM source of unknown strength, or moment. For electric field measurements, a voltage is measured between two grounded electrodes in the EM receiver. In both cases (measured voltages induced by magnetic fields or electric fields), the measurement data is calibrated to convert the voltage to an electric or magnetic field produced by a source of known moment. This calibration involves multiplying the measurement data by a constant such that Eq. 4 becomes:

$$V_{t_i r_j} = k_{r_j} c_s H_{t_i r_j}^0 \beta_{r_j} H_{t_i r_j}^0. \quad \text{(Eq. 5)}$$

where $C_s$ is the system calibration constant that converts a voltage measurement ($V_{t_i r_j}$) to a field value ($H_{t_i r_j}^0$ in this case), and $\beta_{r_j} = k_{r_j} c_s$. The set of $\beta_{r_j}$ values for the multiple receivers $r_j$ are referred to as distortion data parameters that account for various effects on measured EM data, including one or more of distortion caused by presence of a lining structure, distortion caused by near-surface heterogeneity, errors in calibration of the system that includes the EM sources and receivers, and any other effect that causes some variation of the true measured data. An example technique of estimating the calibration constant $c_s$ is described in P. M. van den Berg et al., "Image Reconstruction from Ipswich Data—III," IEEE Antennas and Propagation Magazine, Vol. 41, pp. 27-32 (1999).

In accordance with some examples, the inversion algorithm inverts for the distortion data parameters at the various EM receivers, along with the formation parameters of interest, using a cost function that computes a difference between measured voltage data ($V_{t_i r_j}$) and the product of a term containing predicted EM data ($d_{Pr}(m)$) and a term containing distortion data ($\beta_{r_j}$). In one example, the cost function can be written as:

$$s_d = \quad \text{(Eq. 6)}$$
$$\|W_d[d_{obs} - \beta d_{Pr}(m)]\|^2 = \sum_{j=1}^{N_R} \sum_{i=1}^{N_S} |W_{d(t_i r_j)}(V_{t_i r_j} - \beta_{r_j} d_{Pr}(m)_{t_i r_j})|^2,$$

where $N_R$ is the number of EM receivers, $N_S$ is the number of EM sources, and $\beta$ is a vector whose length is equal to the number of receiver positions. A slightly different way of approaching this problem is to set $\beta_{r_j} = \beta r_j^0 * \beta_{r_j}^{inv}$, where $\beta_{r_j}^0$ is an initial estimate of the distortion parameter that is held constant throughout the inversion, and is derived via the expression:

$$\beta_{r_j}^0 = \frac{\sum_{i=1}^{N_S} W_{d(t_i r_j)}^2 V_{t_i r_j} [d_{pr}^0(m)_{t_i r_j}]^*}{\sum_{i=1}^{N_S} W_{d(t_i r_j)}^2 [d_{pr}^0(m)_{t_i r_j}]^2}. \quad \text{(Eq. 7)}$$

In Eq. 7, $d_{pr}^0(m)_{t_i r_j}$ is the predicted data for the inversion's starting model, and $\beta_{r_j}^{inv}$ is the modified distortion parameter that is being inverted for using the data inversion algorithm according to some examples. This formulation has the advantage that the contrast between inversion parameters ($\beta_{r_j}^{inv}$) that are adjacent to each other along the lining structure (or along a surface) is smaller than that of $\beta_{r_j}^0$, and thus the inversion tends to converge more quickly. Note that if both wells are not cased and/or no other distortions are present in the data, then $k_{r_j} = 1$ for all j, and $\beta_{r_j} = \beta = c_s$ in the above expressions.

To perform the inversion, not only is predicted data $d_{Pr}(m)$ computed using the current model, but the Jacobian matrix is also calculated. For model parameters m, the Jacobian (also referred to as Jacobian determinant) is given as:

$$J'_{t_i r_j l} = \beta_{r_j} \partial (d_{pr}(m)_{t_i r_j}) / \partial m_l = \beta_{r_j} J_{t_i r_j l}, \quad \text{(Eq. 8a)}$$

while for distortion parameters, $\beta$, the corresponding Jacobian is simply given as:

$$J'_{t_i r_j l} = d_{pr}(m)_{t_i r_j}. \quad \text{(Eq. 8b)}$$

Once the Jacobian determinants are known, the Jacobian matrix J is derived and can be inserted into the system of equations as defined by Eq. 2. The iterative procedure of solving for the unknown parameters (unknown reservoir parameters and unknown distortion parameters) are iteratively performed in generally the following manner: the process starts with an initial model m, and the inversion algorithm solves for the distortion data parameters using Eqs. 2 and 7 while minimizing the cost function of Eq. 6; once the first iteration of computed distortion parameter values are derived, the inversion algorithm next solves for reservoir parameters to update the model m using Eq. 2 while minimizing the cost function of Eq. 6; with the updated model m, the inversion algorithm is applied again to update the distortion parameters; and this process continues until convergence is reached or until a predetermined number of iterations have been performed.

In a different implementation, instead of solving for parameters of the model m and the parameters of the distortion data in successive different steps of the inversion procedure, the unknown model parameters and the unknown distortion data parameters can be solved for simultaneously by minimizing the cost function of Eq. 6.

The above assumes that just either the EM receivers or the EM sources are affected by some type of complex distortion parameter. In other cases, both the sources and the receivers will be affected, for example, when both are located in wells cased with conductive lining structures, or where one of the receivers and sources are affected by conductive lining structures and the other of the receivers and sources are affected by near-surface heterogeneity. In this scenario, Eq. 5 is rewritten as:

$$V_{t_i r_j} = k_{t_i} k_{r_j} c_s H_{t_i r_j}^0 = \beta_{t_i} \beta_{r_j} H_{t_i r_j}^0, \quad \text{(Eq. 9)}$$

where $k_{t_i}$ represents the distortion at transmitter $t_i$. In this case, the cost function (Eq. 6) is represented as:

$$s_d = \|W_d[d_{obs} - \beta_T \beta_R d_{Pr}(m)]\|^2 = \quad \text{(Eq. 10)}$$
$$\sum_{k=1}^{N_R} \sum_{i=1}^{N_S} |W_{d(t_i r_j)}(V_{t_i r_j} - \beta_{t_i} \beta_{r_j} d_{Pr}(m)_{t_i r_j})|^2,$$

where $\beta_{t_i}$ is the distortion experienced by transmitter $t_i$. The Jacobian now has three different components. For the model parameters, the Jacobian is given as:

$$J'_{t_i r_j} = \beta_{t_i} \beta_{r_j} \partial(d_{pr}(m)_{t_i r_j})/\partial m_l = \beta_{t_i} \beta_{r_j} J_{t_i r_j}. \quad \text{(Eq. 11a)}$$

For the EM source $\beta_{t_i}$'s, the Jacobian is given as:

$$J'_{t_i r_j} = \beta_{r_j} d_{pr}(m)_{t_i r_j}, \quad \text{(Eq. 11b)}$$

while for the EM receiver $\beta_{r_j}$'s, the Jacobian is computed as:

$$J'_{t_i r_j} = \beta_{t_i} d_{pr}(m)_{t_i r_j}, \quad \text{(Eq. 11b)}$$

The inversion procedure as discussed above can be used to iteratively solve for unknown model parameters and unknown distortion parameters, minimizing the cost function of Eq. 10 and using Eqs. 2 and 11a-11c, until convergence is reached or until a predetermined number of iterations have been performed.

An alternative approach for carrying out the inversion when both the source and receiver are affected by distortion parameters is to employ a data-ratio approach as described in U.S. Ser. No. 11/768,975, entitled "Method and System for Removing Effects of Conductive Casings and Wellbore and Surface Heterogeneity in Electromagnetic Imaging Surveys, ", filed Jun. 27, 2007. The inversion algorithm can simultaneously invert for ratios of the casing coefficients in one of the wells. For example, the following cost function can be used to invert for ratios of casing coefficients in the receiver well:

$$s_d = \sum_{i=1}^{N_S} \sum_{f_i(k,l)} \left| W_{d(t_i r_l)} V_{t_i r_l} \gamma_{r_k r_l} \frac{d_{pr}(m)_{t_i r_k}}{d_{pr}(m)_{t_i r_l}} - W_{d(t_i r_k)} V_{t_i r_k} \right|^2, \quad \text{(Eq. 12a)}$$

where $\gamma_{r_k r_l} = \beta_{r_k}/\beta_{r_l}$. In this case, ratios of data from the k and l receivers are used. Alternatively, ratios of data from the i and j transmitters can be used, and the following cost function is minimized:

$$s_d = \quad \text{(Eq. 12b)}$$
$$\sum_{k=1}^{N_R} \sum_{f_k(i,j)} \left| W_{d(t_j r_k)} V_{t_j r_k} \eta_{t_i t_j} \frac{d_{pr}(m)_{t_i r_k}}{d_{pr}(m)_{t_j r_k}} - W_{d(t_i r_k)} V_{t_i r_k} \right|^2,$$

where $\eta_{t_i t_j} = \beta_{t_i}/\beta_{t_j}$.

In Eq. 12a or 12b, the cost function to be minimized in the data inversion algorithm computes the difference between weighted measured voltage data and a term that includes the product of a ratio $\gamma_{r_k r_l}$ or $\eta_{t_i t_j}$ of the distortion parameters of the EM sources or EM receivers and a ratio of predicted EM data for different transmitters and receivers.

Figure 2:
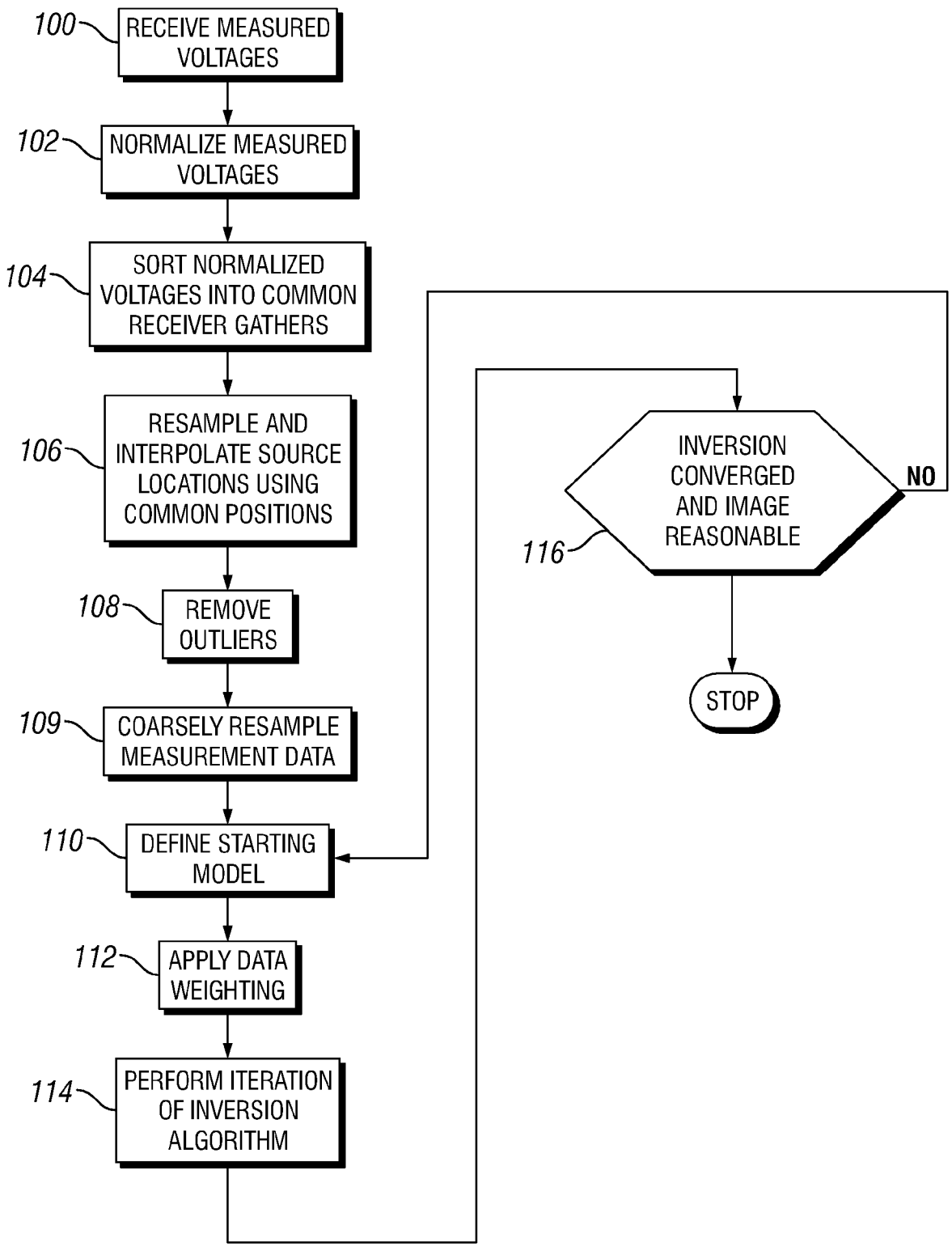
FIG. 2 is a flow diagram of a process for characterizing a subterranean structure based on EM data measured by EM receivers in response to EM sources.

FIG. 2 illustrates a process flow of an example data processing algorithm. The data processing algorithm of FIG. 2 can be performed using software executable on a computer (see FIG. 3), for example.

Measured voltages are received (at 100), where the measured voltages are collected by EM receivers 24 (FIGS. 1A-1E) in response to activation of one or more EM sources 20. The measured voltages can be voltages induced in a receiver solenoid by both primary and secondary magnetic fields generated in response to activated EM sources. Alternatively, the measured voltages can be induced in EM receivers by electric fields. The primary field is the magnetic field that is generated by a current of known amplitude (I) flowing in a source solenoid, while the scattered (secondary) fields are those generated by currents that are electromagnetically induced in the subterranean structure and the conductive lining structures by the primary fields. The strength of a measured voltage depends on the transmitter moment of an EM source, which is unknown but is linearly proportional to the current (I). To correct the measured voltage data to a constant transmitter moment, the measured voltage data is normalized (at 102) by some value that tracks the moment. This value can be the measured transmitter current of an EM source, or a second measurement that is proportional to the moment, such as voltage produced in a secondary solenoid that is wrapped around the transmitting solenoid through which the energizing current is flowing. Basically, the normalizing performed at 102 is to calibrate the measured voltage values to take into account variations of different EM sources.

Next, the normalized voltages are sorted (at 104) into common receiver "gathers" or profiles. For each given receiver that is fixed in position in a wellbore or on a surface, an EM source may change position over time (such as when the EM source moves inside the wellbore during a logging operation). In this scenario, from the perspective of each EM receiver, a series of measurements are made for different EM source positions. A gather or profile is a series of measurements by the receiver for different source positions.

Sorting is performed since measurement data taken by the various receivers are collected nearly continuously while logging proceeds in the wellbore in which the EM source(s) is (are) located. Such a procedure yields many more source positions than receiver positions. Moreover, the position of a given EM source may change slightly from run to run due to changes in logging speed, mis-positioning, cable stretching, and so forth, and thus actual source positions over multiple runs (a "run" refers to a particular iteration of a logging operation) may vary. Sorting of the measurement data allows for the normalized voltages to be separated into gathers for respective receivers.

Next, the measurement data is resampled and interpolated (at 106) to a common set of source positions. Since there are multiple runs of EM sources, the sources are unlikely to reoccupy the same position in each run. The resampling and interpolating performed at 106 involves first defining a common source depth interval for all of the receiver profiles, where the common source depth interval is defined as the interval between the minimum depth and the maximum depth of the sources. Next, the minimum spatial sampling interval among all the profiles is determined and used to define the source positions that will be employed for all profiles; these positions are referred to as the global source positions. Finally, interpolation of the measurement data is performed to interpolate data from the actual measurement positions to the global positions. Effectively a common set of source positions is defined over the various runs of EM sources, with the measurement data for each run interpolated to compensate for the shift from an actual source position to a corresponding global position.

In one example, the interpolation technique can be a spline technique. For densely sampled source positions such as those acquired in a cross-borehole survey, this processing procedure introduces minimum alteration to the profiles while providing a common source array for all receiver positions. Note that this step may not need to be applied to STB or surface CSEM surveys when both the source and receivers are deployed in fixed, discrete locations.

Next, outliers are removed (at 108) from each receiver gather. Outliers refer to measurement data that vary from the remaining measurement data by more than some predefined amount. A despiking computer algorithm can be used to remove outliers.

In some cases, the sampling performed at 106 may be too fine. For example, the sampling performed at 106 may use a dense sampling interval of 0.25 meters, while the minimum spacing between receivers is 2.5 meters, in one example. Such dense sampling would result in a relatively large amount of measurement data that is of little relevance. Thus, coarse resampling of the measurement data is performed (at 109) to enlarge the sampling intervals. In the example above, the coarse resampling will cause every tenth data point to be selected to yield a source at every 2.5 meters. Note that this step may not have to be applied for STB or surface CSEM surveys as both the source and receivers may be deployed in discrete positions.

Next, the algorithm defines (at 110) a starting model (which initially is $m^{ref}$ in Eq. 2 above) of the subterranean structure. This starting model is used as the starting point for the imaging process. The model may be based on geologic, geophysical, and petrophysical data that are available from wells, seismic data, geologic studies, and so forth. The conductivity structure for either a two-dimensional cross-section or three-dimensional volume can be produced. The starting model can be derived using various techniques, ranging from simple techniques, such as laterally interpolating between two resistivity well logs, to more involved techniques such as using a geologic modeling software package. This starting model represents a best estimate of what the conductivity structure is prior to the inversion to be performed according to example techniques described herein.

Next, data weighting is applied (at 112). Different types of data weighting can be used. For example, data can be weighted by the estimated noise in the measurements, which is generally given by some percentage of the maximum measured amplitude. Other techniques include weighting each data point by some percentage of the datum amplitude. Data weighting is represented by the $W_d$ data weighting matrix used in Eq. 2.

Next, an iteration of the inversion algorithm is performed (at 114), which involves calculating the appropriate Jacobian matrix as given by Eq. 8a-8b, 11a-11c, or 12a-12b, depending on the cost function that is employed. This sets up the appropriate system of linear equations according to Eq. 2. Inversion applied on the linear equations produces a result set for the distortion data parameters β. Thus, given the values of β, updated resistivity image parameters $m^i$ (for the $i^{th}$ iteration) are solved for by inverting on the system of equations according to Eq. 2.

Next, it is determined (at 116) if the inversion has converged, and if the resulting image is geologically reasonable. If not, then the process at 110-114 is repeated in the next iteration (i is incremented). However, if convergence has been reached (or a predetermined number of iterations have been performed), and the resulting image is geologically reasonable, then the inversion algorithm stops. The data misfit measure of Eq. 6 can be used to indicate whether convergence has been reached. The data misfit measure of FIG. 2 represents the difference between the field data being inverted, and the calculated model response. The smaller the misfit, the better the resulting model can explain the field data. In some examples, the data misfit can be defined to be within a root mean square (RMS) estimate of the noise level.

Determining if the resulting image is geological reasonable is relatively subjective. For example, a user can assess the image using the user's geologic, engineering, and other geophysical knowledge to see if the results make sense. If not, the user can either modify the starting model, the well geometry, or the data weighting, and return to the inversion algorithm of FIG. 2.

Figure 3:
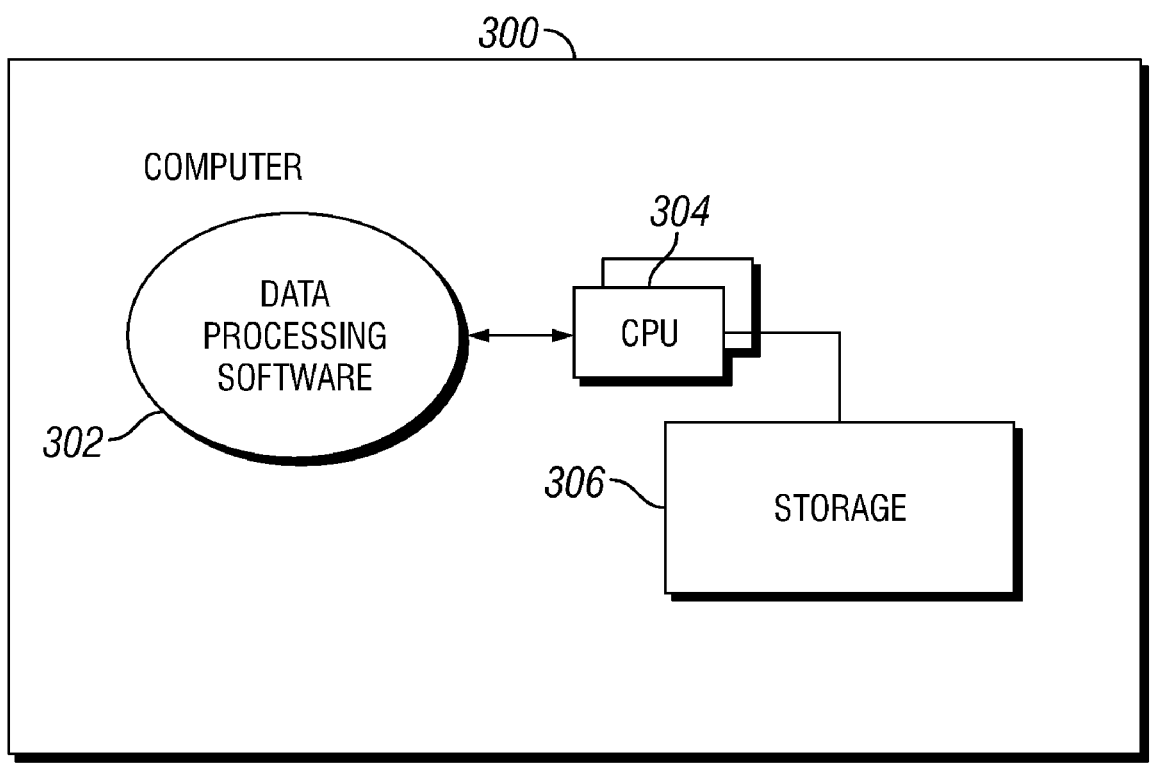
FIG. 3 is a block diagram of a computer that includes data processing software for performing the process of FIG. 2.

FIG. 3 is a block diagram of an example computer 300 in which data processing software 302 is executable to perform the inversion algorithm described above. The data processing software 302 is executable on one or more central processing units (CPUs) 304. The CPU(s) 304 is (are) connected to a storage 306, which stores measurement data, model data, information relating to distortion parameters, and so forth.

Instructions of the software 302 are loaded for execution on a processor (such as the one or more CPUs 304 in FIG. 3). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of characterizing an earth subterranean structure using a measurement assembly including electromagnetic (EM) receivers and one or more EM sources, the method comprising:

receiving measured voltage data collected by the EM receivers in response to transmission by the one or more EM sources;

computing in a simulator, based on a model, predicted EM data; and in a data processor, iteratively performing inversion according to a cost function that computes a difference between the measured voltage data and a product of a term containing the predicted EM data and a matrix term containing a distortion data parameter for each EM source or EM receiver that accounts at least for a distortion effect by an environment of the measurement assembly, wherein iteratively performing the inversion solves for parameters of the model and the distortion data parameters;

wherein receiving the measured voltage data comprises receiving the measured voltage data from one of a cross-borehole survey, a surface-to-borehole survey, a borehole-to-surface survey, and a single-well borehole-to-borehole survey.

2. An article comprising at least one non-transitory computer-readable storage medium containing instructions that when executed cause a computer to:

receive measured voltage data collected by a measurement assembly comprising one or more EM receivers and one or more EM sources, the voltage data being collected by the one or more EM receivers in response to transmission by the one or more EM sources;

compute, based on a model, predicted EM data; and iteratively perform inversion according to a function that computes a difference between the measured voltage data and a product of a term containing the predicted EM data and a matrix term containing a distortion data parameter for each EM source or EM receiver that accounts at least for a distortion effect by an environment of the measurement assembly, wherein iteratively performing the inversion solves for parameters of the model and the distortion data parameter;

wherein the measured voltage data is collected from one of a cross-borehole survey, a surface-to-borehole survey, a borehole-to-surface survey, a single-well borehole-to-borehole survey, and a surface controlled source electromagnetic survey.

3. A system comprising:

a measurement assembly including one or more electromagnetic (EM) sources and EM receivers; and a data processing computer to:

receive measured voltage data collected by the EM receivers in response to transmission by the one or more EM sources;

compute, based on a model, predicted EM data; and iteratively perform inversion according to a function that computes a difference between the measured voltage data and a product of a term containing the predicted EM data and a matrix term containing distortion parameters for each EM source or EM receiver that account at least for a distortion effect by an environment of the measurement assembly, wherein iteratively performing the inversion solves for parameters of the model and the distortion parameters;

wherein the measured voltage data is collected by the EM receivers in one of a cross-borehole survey, a surface-to-borehole survey, a borehole-to-surface survey, a single-well borehole-to-borehole survey, and a surface controlled source electromagnetic survey.

* * * * *